(12) United States Patent
Look

(10) Patent No.: US 7,174,066 B1
(45) Date of Patent: Feb. 6, 2007

(54) METHOD AND AN APPARATUS TO DETECT SIGNAL FAILURE ON A PER WAVELENGTH BASIS

(75) Inventor: Christopher M. Look, Pleasanton, CA (US)

(73) Assignee: Intellambda Systems, Inc., Fremont, CA (US)

( * ) Notice: Subject to any disclaimer, the term of this patent is extended or adjusted under 35 U.S.C. 154(b) by 42 days.

(21) Appl. No.: 10/785,619

(22) Filed: Feb. 23, 2004

(51) Int. Cl.
 *G02B 6/26* (2006.01)
(52) U.S. Cl. .......................... 385/17; 385/24; 385/140
(58) Field of Classification Search ................ None
 See application file for complete search history.

(56) References Cited

U.S. PATENT DOCUMENTS

| | | | |
|---|---|---|---|
| 5,627,925 A | * | 5/1997 | Alferness et al. ............. 385/17 |
| 5,867,289 A | * | 2/1999 | Gerstel et al. ................ 398/12 |
| 5,970,201 A | * | 10/1999 | Anthony et al. ............. 385/140 |
| 6,332,055 B1 | * | 12/2001 | Hatayama et al. ........... 385/140 |
| 6,801,679 B2 | * | 10/2004 | Koh et al. ..................... 385/14 |
| 2004/0208574 A1 | * | 10/2004 | Kinoshita et al. ............. 398/83 |

OTHER PUBLICATIONS

Rajiv Ramaswami et al., "Optical Networks, A Practical Perspective" Second Edition, Morgan Kaufmann Publishers, ISBN 1-55860-655-6, San Francisco, CA, USA. (831 pages), 2002 month unknown.

* cited by examiner

*Primary Examiner*—Rodney Bovernick
*Assistant Examiner*—Mike Stahl
(74) *Attorney, Agent, or Firm*—Blakely Sokoloff Taylor Zafman LLP (57) ABSTRACT

A method and an apparatus to provide optical equipment protection have been disclosed. In one embodiment, the method includes diverting a predetermined portion of each of a plurality of optical signals to a plurality of photonic detectors within a first optical network node, and detecting the plurality of signals using the plurality of photonic detectors, each of the plurality of photonic detectors being designated to detect one of the plurality of optical signals. Other embodiments have been claimed and described.

11 Claims, 10 Drawing Sheets

METHOD AND AN APPARATUS TO DETECT SIGNAL FAILURE ON A PER WAVELENGTH BASIS

FIELD OF INVENTION

The present invention relates to optical network systems, and more particularly, to detecting signal failure on a per wavelength basis within an optical network node in an optical network system.

BACKGROUND

In a contemporary optical network system, a number of optical network nodes may be coupled to each other via optical fibers. Optical signals are transmitted across the optical fibers from one optical network node to another. When an optical network node is installed into an optical network system, the optical network node may have to be pre-configured. For instance, the optical fibers have to be connected to their corresponding input and output ports of the optical network node so that the optical network node can function properly.

In a contemporary optical network node, Dense Wavelength Division Multiplexing (DWDM) is performed on an incoming optical signal to divide the incoming optical signal into a number of optical signals, each carried in a different wavelength. To detect signal loss in a particular wavelength, some existing optical network nodes include an Optical Channel Monitor (OCM) to detect the optical signals on a per wavelength basis. However, the OCM is typically rather slow.

Alternatively, some of the existing optical network nodes include a feedback loop coupled between a tap and a variable optical attenuator (VOA). The tap receives optical signals from the VOA and diverts part of the optical signals to the feedback loop. In response to the signal from the tap, the feedback loop detects the signal loss in the optical signals entering the tap and causes the VOA to adjust for any optical signal loss accordingly. However, this scheme compromises the speed of signal loss detection for accuracy in the feedback loop.

SUMMARY

The present invention includes a method to detect signal failure on a per wavelength basis within an optical network node. In one embodiment, the method includes diverting a predetermined portion of each of a plurality of optical signals to a plurality of photonic detectors within a first optical network node, adjusting a power level of each of the plurality of optical signals after diverting the predetermined portion of each of the plurality of optical signals, and detecting the plurality of signals using the plurality of photonic detectors, each of the plurality of photonic detectors being designated to detect one of the plurality of optical signals.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and an apparatus to detect signal failure on a per wavelength basis within an optical network node in an optical network system is described. In the following description, numerous specific details are set forth. However, it is understood that embodiments of the invention may be practiced without these specific details. In other instances, well-known components, structures, and techniques have not been shown in detail in order not to obscure the understanding of this description.

Some portions of the following detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 1A:
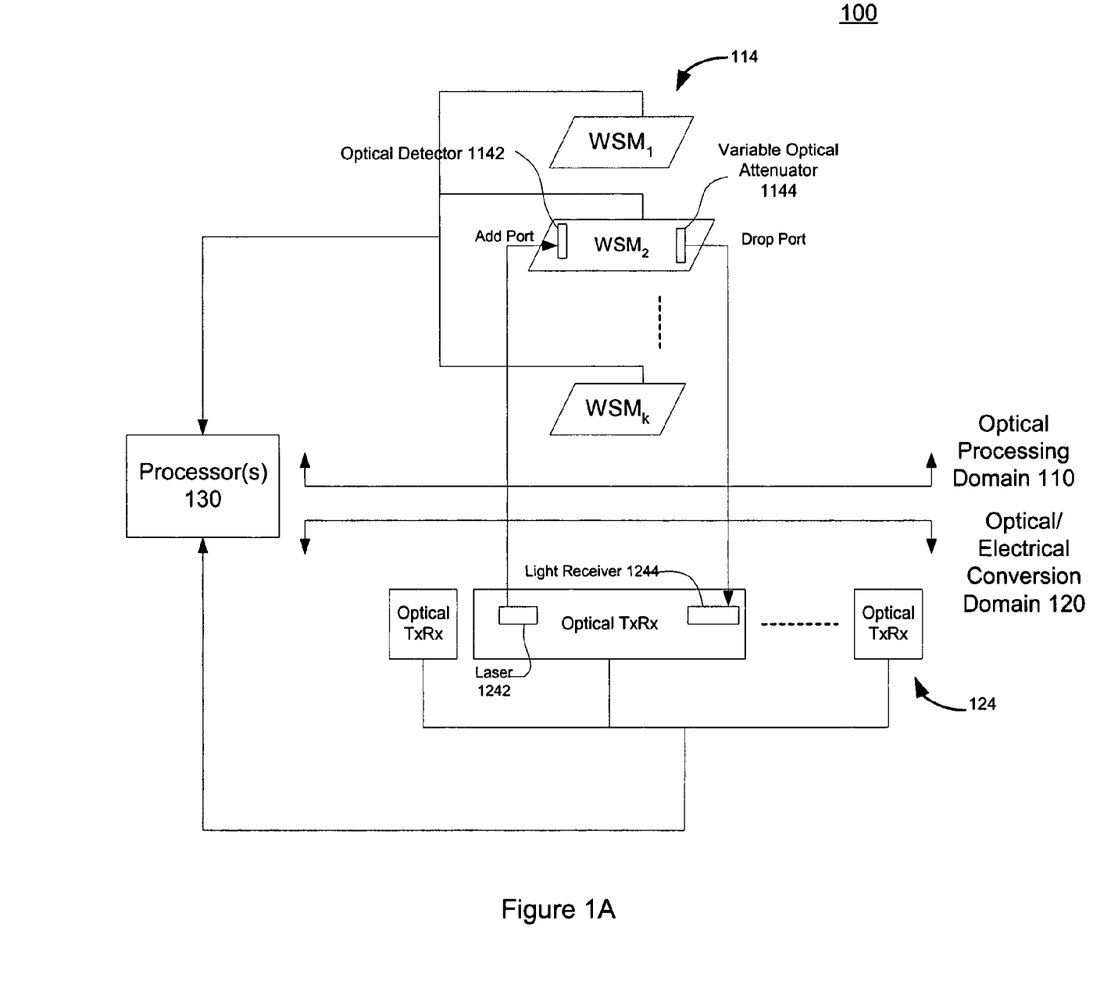
FIG. 1A illustrates an embodiment of an optical network node.

FIG. 1A illustrates one embodiment of an optical network node. The optical network node 100 includes an optical processing domain 110, an optical/electrical conversion domain 120, and a processor 130. The optical processing domain 110 may include a number of wavelength switch modules (WSMs) 114. Each of the wavelength switch modules 114 may include a number of input and output ports, one or more photonic detectors 1142 and one or more variable optical attenuators (VOA) 1144. However, not all input and output ports are shown to avoid obscuring the view of FIG. 1A.

Referring to FIG. 1A, the optical/electrical conversion domain 120 includes a number of optical transceivers 124. Each of the optical transceivers 124 may include a light source 1242 and a light receiver 1244. In some embodiments, the light source 1242 includes a laser. Furthermore, the laser may be tunable.

The processor 130 receives inputs from the WSMs 114 and the optical transceivers 124 and coordinates the optical processing domain 110 and the optical/electrical conversion domain 120 in response to these inputs. In an alternate embodiment, the processor 130 may include multiple processing units.

In one embodiment, the light source 1242 in one of the optical transceivers sends a first optical signal to one of the input ports of one of the WSMs 114. The light receiver 1244 in the optical transceiver receives a second optical signal from one of the output ports of the WSM and determines whether the second optical signal corresponds to the first optical signal. By correlating the first and the second optical signals, the optical network node automatically verifies connectivity between the optical shelf 110 and the optical-electrical shelf 120. More detail on various embodiments of the process to verify connectivity and the process to detect signal loss on a per wavelength basis is discussed below.

Figure 1B:
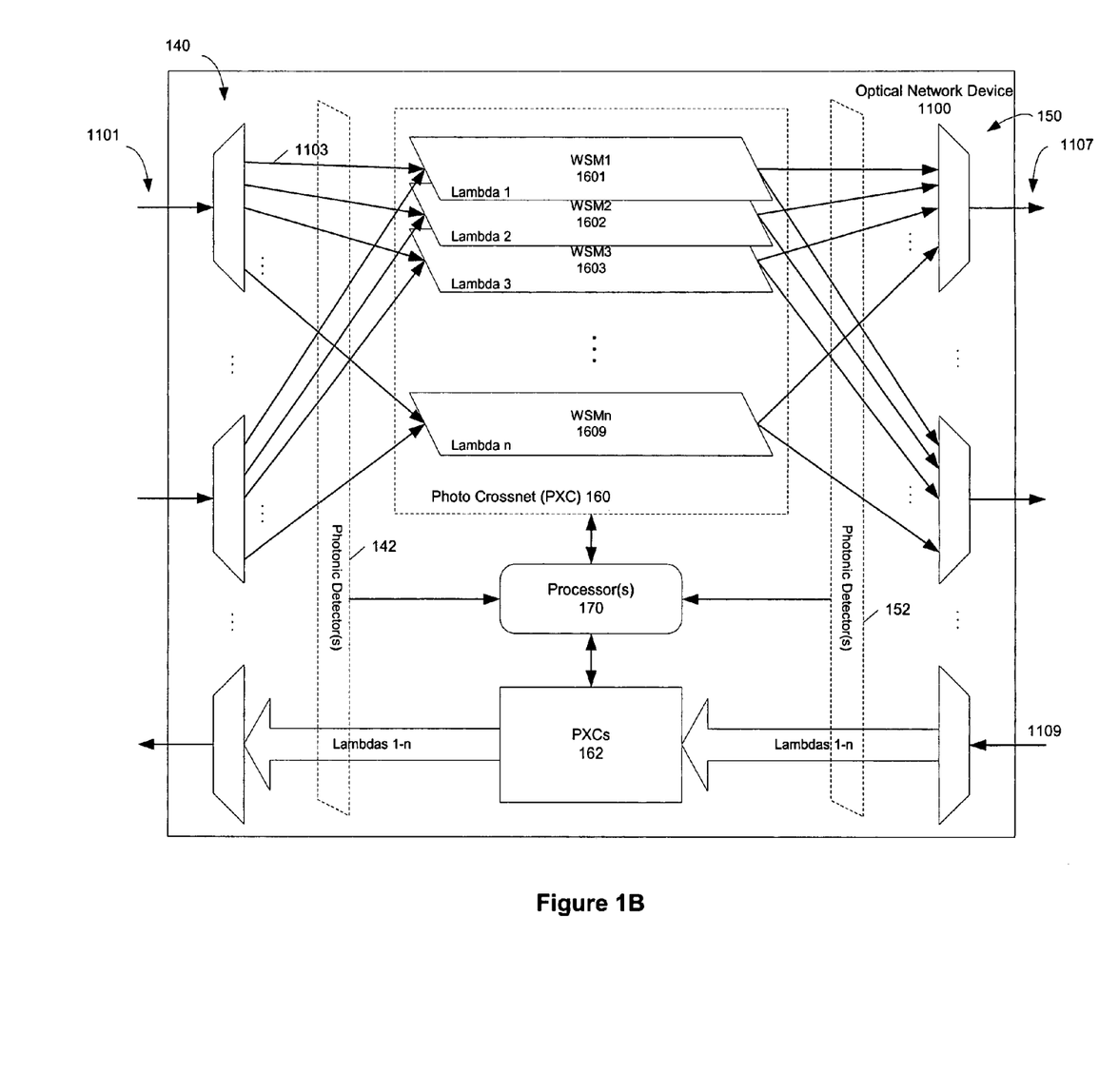
FIG. 1B illustrates one embodiment of an optical network node.

FIG. 1B illustrates one embodiment of an optical network node. The optical network node 1100 includes a number of demultiplexers 140, a number of multiplexers 150, a number of photonic detectors 142 and 152, a number of photonic crossnets (PXCs) 160 and 162, and one or more processors 170. The PXCs 160 and 162 are coupled to the processors 170. Referring to FIG. 1, the PXC 160 is shown in greater detail than the other PXCs 162 for the purpose of illustrating the concept without obscuring the view. Each of the PXCs 160 and 162 may be substantially similar to each other. The PXC 160 includes a number of WSMs, such as the WSMs 1601, 1602, 1603, etc. In one embodiment, there are eight WSMs in one PXC. Each of the WSMs 1601–1609 is designated to handle a predetermined wavelength, which is also referred to as lambda. The photonic detectors 142 and 152 may include a number of photodiodes to detect the loss of optical signal (e.g., the loss of light) on a per-wavelength basis. Furthermore, one should appreciate that in the current description, the phrases "loss of signal," "loss of optical signal," and "loss of light" are used interchangeably to refer to the same concept.

The demultiplexers 140 receive a number of incoming optical signals 1101. Some of the incoming optical signals 140 may come from another optical network node. Alternatively, some of the incoming optical signals 140 may be generated from electrical signals by the optical electrical shelf (e.g., the optical-electrical shelf 120 in FIG. 1A) in the optical network node 1100. Each of the demultiplexers 140 demultiplexes each of the incoming optical signals 1101 by wavelength into the optical signals 1103. The optical signals 1103 are forwarded to the WSMs 1601–1609 according to their wavelengths. Signals having the same wavelength are forwarded to a predetermined WSM. For example, signals having a wavelength of lambda1 are forwarded to the WSM1 1601. In between the PXC 160 and the demultiplexers 140, the optical signals 1103 may pass through the photonic detectors 142. If the photonic detectors 142 detect a signal loss among the optical signals 1103, the photonic detectors 142 may send an alarm or an interrupt to the processors 170 to notify the processors 170.

Each of the optical signals 1103 enters one of the WSMs 1601–1069 via an input port of the WSM and exits the WSM via a corresponding output port as the optical signals 1105. The optical signals 1105 are forwarded to the multiplexers 150, which multiplexes the optical signals 1105 by their wavelengths to output the optical signals 1107. In between the PXC 160 and the multiplexers 150, the optical signals 1105 may pass through the photonic detectors 152. If the photonic detectors 152 detect a signal loss among the optical signals 1105, the photonic detectors 152 may send an alarm or an interrupt to the processors 170 to notify the processors 170.

The optical network node 1100 may further include additional PXCs 162. Some of the PXCs 162 may transmit optical signals in the opposite direction of the optical signals through the PXC 160, such as the optical signal 1109.

Figure 1C:
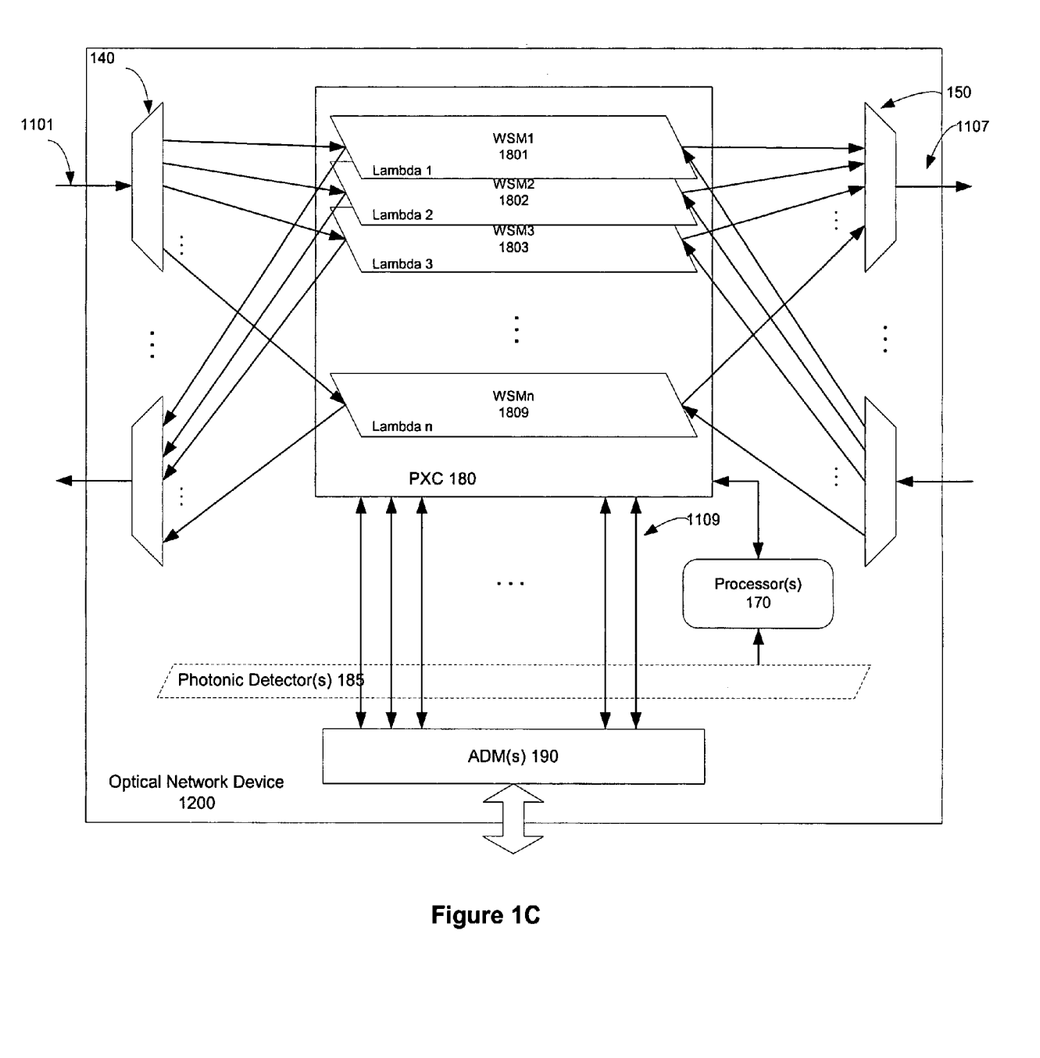
FIG. 1C illustrates an alternate embodiment of an optical network node.

FIG. 1C illustrates an alternate embodiment of an optical network node. The optical network node 1200 includes a number of demultiplexers 140, a number of multiplexers 150, a number of photonic detectors 185, a PXC 180, one or more Add/Drop multiplexers (ADMs) 190, and one or more processors 170. One should appreciate that the optical network node 1200 may include multiple PXCs. However, only one PXC 180 is shown in FIG. 1C as an example to avoid obscuring the view. The PXC 180 includes a number of WSMs 1801–1809. In one embodiment, the PXC 180 has eight WSMs.

The demultiplexers 140 receive a number of incoming optical signals 1101. Each of the demultiplexers 140 demultiplexes each of the incoming optical signals 1101 by wavelength into the optical signals 1103. The optical signals 1103 are forwarded to the WSMs 1801–1809 within the PXC 180 according to their wavelengths. Signals having the same wavelength are forwarded to a predetermined WSM. For example, signals having a wavelength of lambda1 are forwarded to the WSM1 1801.

The PXC 180 may divert a portion of each of the optical signals 1103 to the photonic detectors 185. The portions diverted to the photonic detectors 185 are represented as the signals 1109 in FIG. 1C. If the photonic detectors 185 detect a signal loss among the optical signals 1109, the photonic detectors 185 may send an alarm or an interrupt to the processors 170 to notify the processors 170. Furthermore, via the photonic detectors 185, the optical signals 1109 are forwarded to the ADMs 190. The ADMs 190 may multiplex the optical signals 1109 by wavelength and forward the multiplexed signals to the optical-electrical shelf (not shown) of the optical network node 1200.

Referring back to the PXC 180, each of the optical signals 1103 enters one of the WSMs 1801–1809 within the PXC 180 via an input port of the WSM and exits the WSM via a corresponding output port as the optical signals 1105. The optical signals 1105 are forwarded to the multiplexers 150, which multiplexes the optical signals 1105 by their wavelengths to output the optical signals 1107.

Figure 2A:
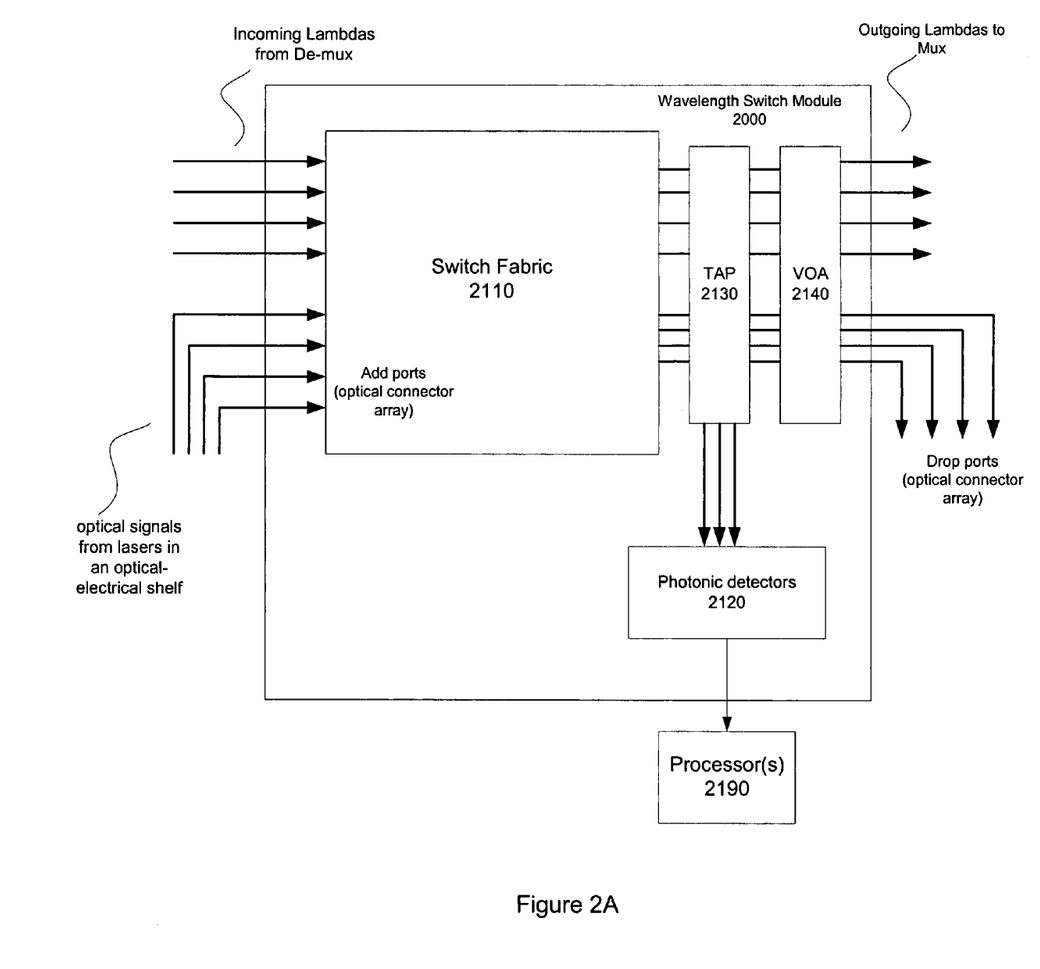
FIG. 2A illustrates one embodiment of a wavelength switch module.

FIG. 2A illustrates one embodiment of a WSM in an optical network node. The WSM 2000 includes switch fabric 2110, a number of photonic detectors 2120, a tap 2130, and a variable optical attenuator (VOA) 2140. The VOA 2140 may be on the same board with the tap 2130, the switch fabric 2110, and the photonic detectors 2120. Alternatively, the VOA 2140 may be on a separate board. The outputs of the switch fabric 2110 are optically coupled to the tap 2130. Some of the outputs of the tap 2130 are optically coupled to the inputs of the VOA 2140 while some of the outputs of the tap 2130 are optically coupled to the inputs of the photonic detectors 2120. The photonic detectors 2120 may include some photodiodes.

In one embodiment, the size of the switch fabric 2110 is 32×32. The switch fabric 2110 may include four 8×8 switches, wherein each of the 8×8 switches is non-blocking. The switch fabric 2110 further includes a number of input ports and a number of output ports. The switch fabric 2110 receives an optical signal via each of the input ports and forwards the optical signal to one of the output ports. The optical signal may be derived from another optical signal received from another optical network node. Alternatively, the optical signal may be generated from an electrical signal by the optical-electrical shelf of the optical network node. However, the WSM 2000 is designated to handle signals carried in a predetermined wavelength in one embodiment, and therefore, all the input optical signals to the switch fabric 2110 have the same wavelength. In one embodiment, the default configuration of the switch fabric 2110 is to connect an input port straight to the corresponding output port. Such a configuration is illustrated in FIG. 2B.

Figure 2B:
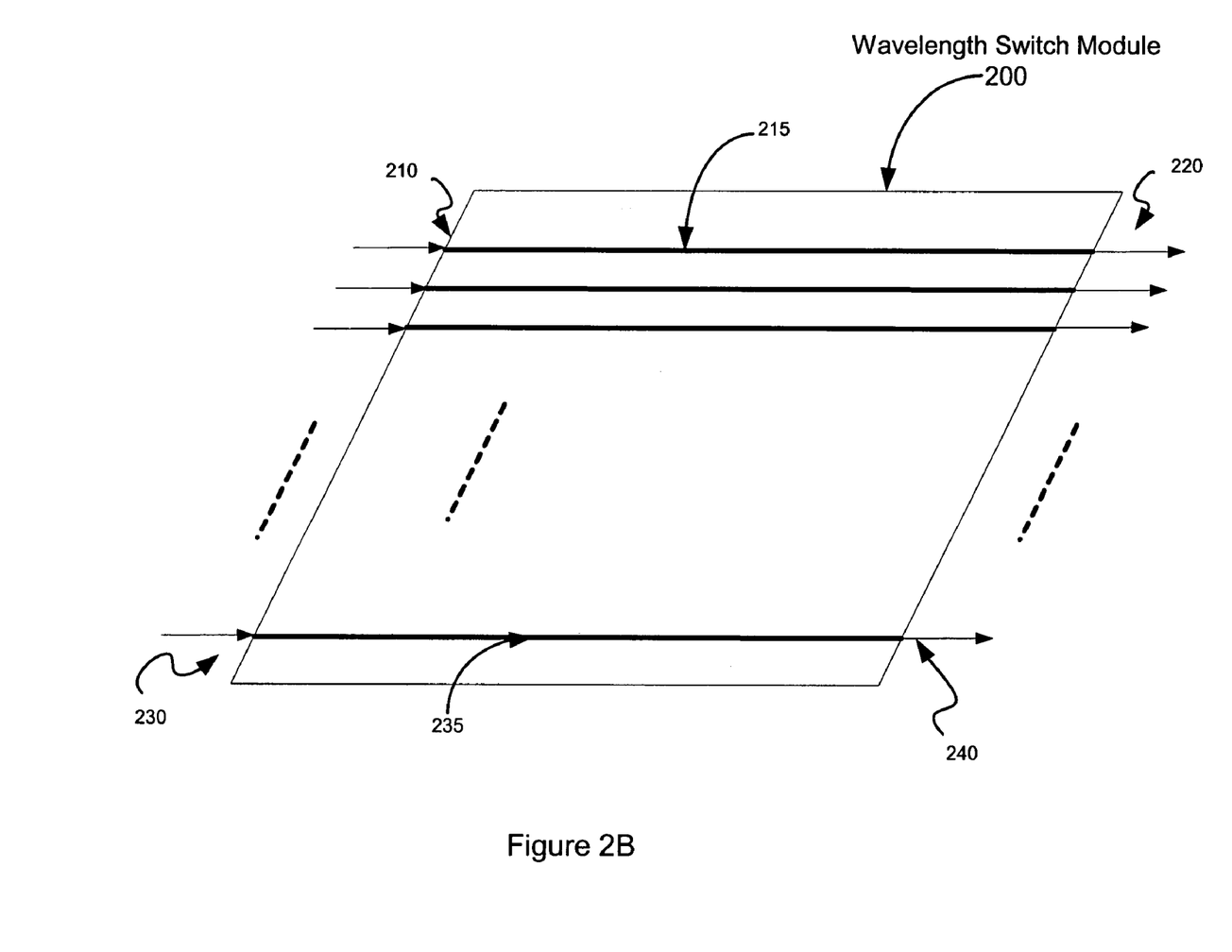
FIG. 2B illustrates a default configuration of one embodiment of a switch fabric.

Referring to FIG. 2B, for instance, the optical signal entering the input port 210 of the WSM 200 is transmitted via the channel 215 to the corresponding output port 220. Likewise, the optical signal entering the input port 230 is transmitted via the channel 235 to the corresponding output port 240. Furthermore, each of the input and output ports of the WSM 200 may be configured to be an Add or a Drop port that receives or outputs optical signal to the electrical shelf of the optical network node.

Referring back to FIG. 2A, the output ports of the switch fabric 2110 are coupled to the input ports of the tap 2130. The tap 130 diverts a predetermined portion (e.g., approximately 5%) of each of the optical signals received from the switch fabric 2110 to the photonic detectors 2120. Each of the photonic detectors 2120 is designated to detect a distinct optical signal from the tap 2130. The tap 2130 sends the remaining portion (e.g., approximately 95%) of each of the optical signals to the VOA 2140. In one embodiment, the VOA 2140 adjusts the power level of each of the optical signal received from the tap 2130.

In response to detecting a signal loss, one of the photonic detectors 2120 may send a signal to the processors 2190. As discussed above, the WSM 2000 is designated to handle optical signals in a predetermined wavelength, therefore, including the photonic detectors 2120 in the WSM 2000 enables the detection of signal loss on a per wavelength basis.

Figure 3A:
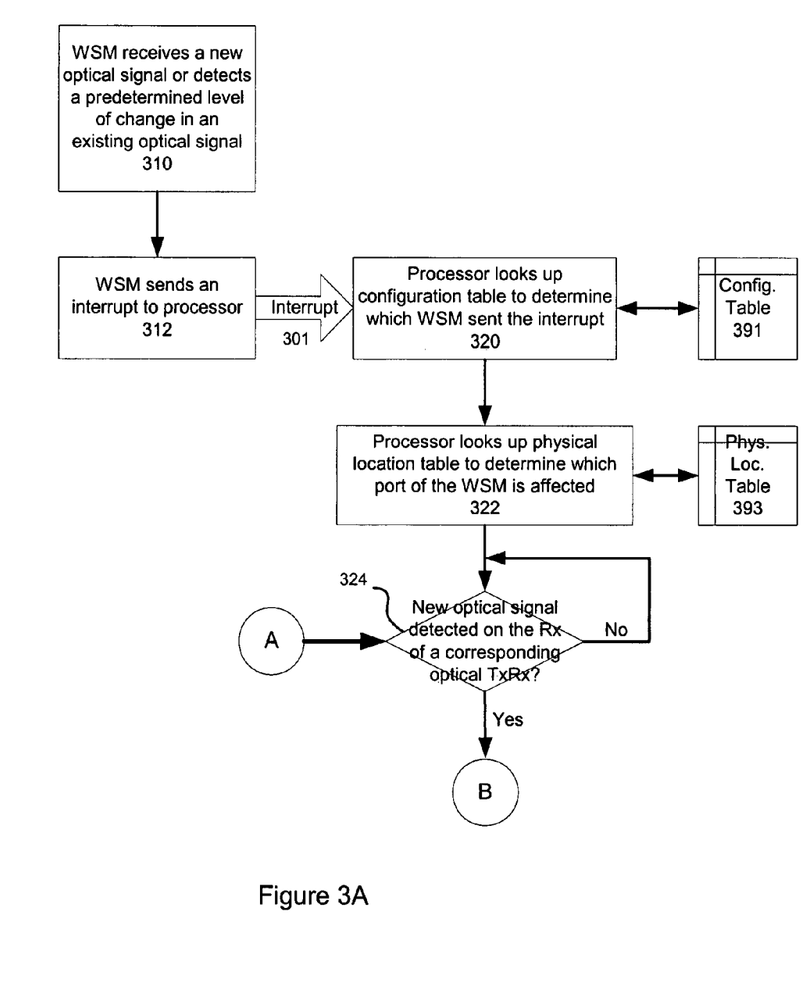
FIGS. 3A–3C illustrates flow diagrams of one embodiment of a process to automatically verify connectivity within an optical network node.
Figure 3B:
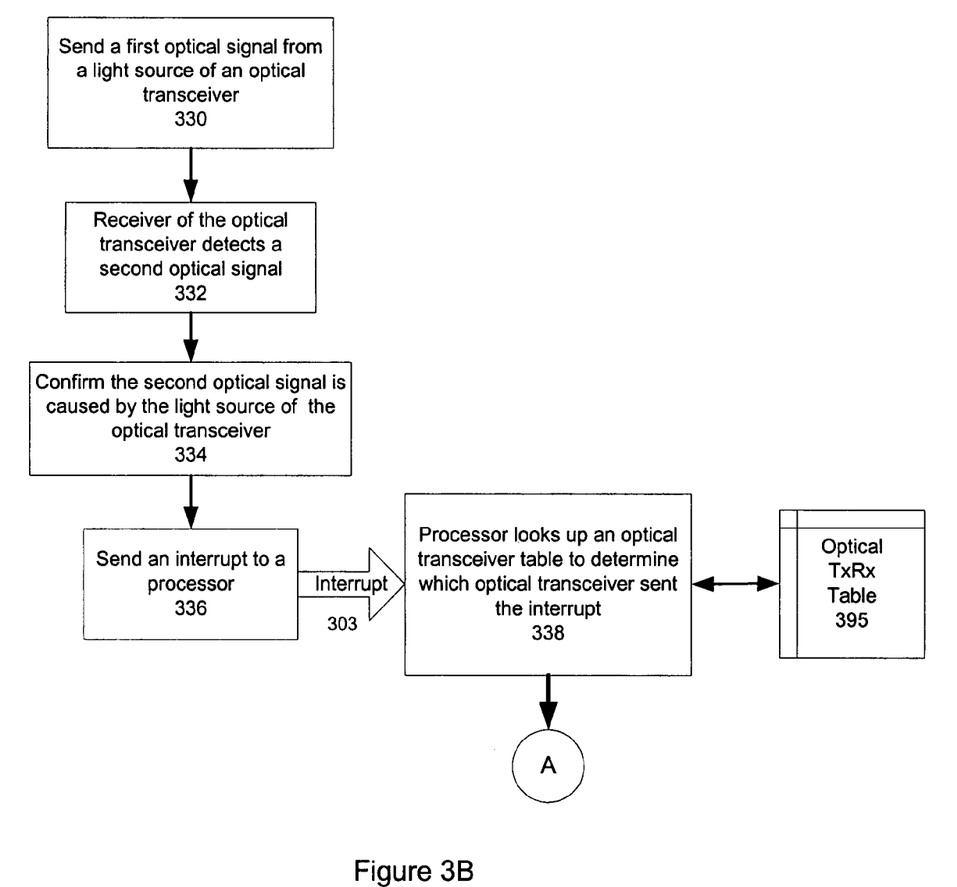
Figure 3C:
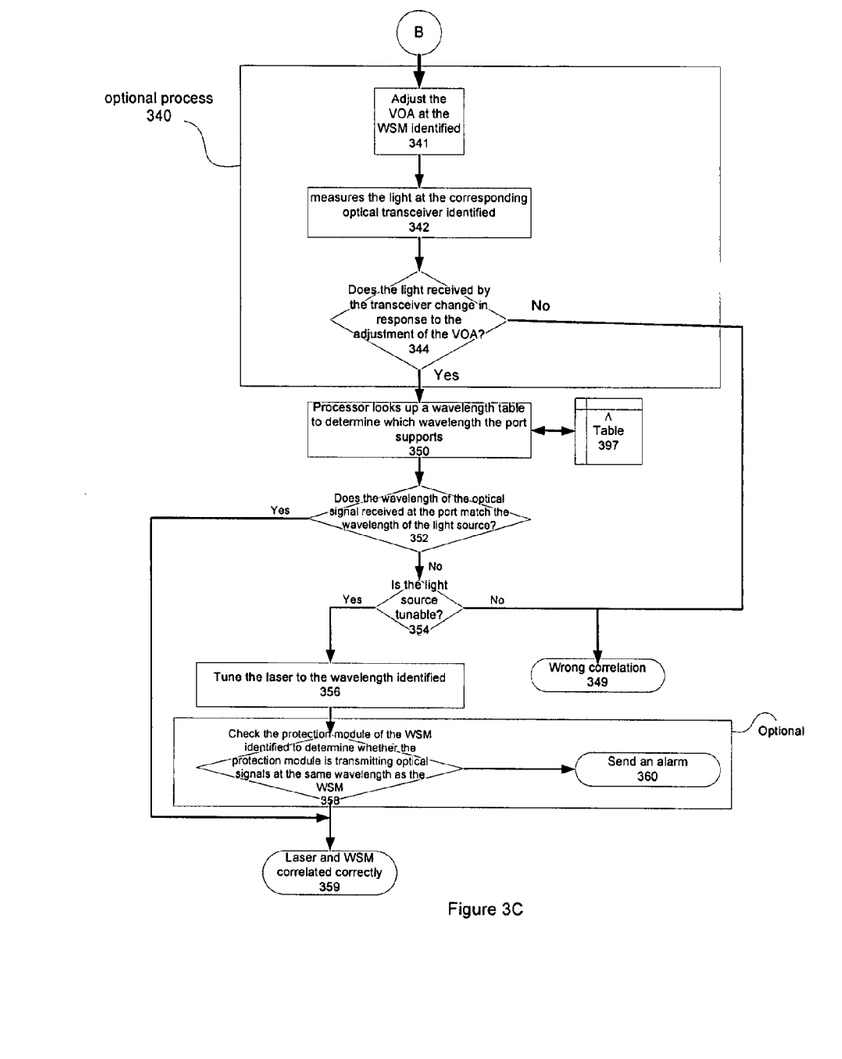

FIGS. 3A–3C illustrate flow diagrams of embodiments of a process to verify connectivity in an optical network node in a optical network system. The process is performed by processing logic that may comprise hardware (e.g., circuitry, dedicated logic, etc.), software (such as is run on a general-purpose computer system or a dedicated machine), or a combination of both.

Referring to FIG. 3A, a WSM in an optical shelf of the optical network node receives a new optical signal or detect a predetermined level of change in an existing optical signal from an optical transceiver in the optical-electrical shelf of the optical network node at block 310. In response to the new optical signal or the change in the existing optical signal detected, the WSM sends an interrupt 301 to a processor at block 312. In response to the interrupt 301, at block 320, the processor looks up a configuration table 391 to determine which WSM in the optical network node sent the interrupt 301. Then at block 322, the processor looks up a physical location table 393 to determine which port of the WSM identified in block 320 is affected. At block 324, processing logic then determines whether a new optical signal is detected on the receiver port of the optical transceiver from which the optical signal detected by the WSM is sent.

FIG. 3B illustrates one embodiment of a process to detect optical signal on the receiver port of the optical transceiver. Initially, a light source of the optical transceiver, such as a laser, turns on at block 330. After the light source has turned on, the optical receiver detects a new optical signal at block 332. Processing logic then confirms that the new optical signal is caused by the optical signal sent from the light source at block 334. Then processing logic sends an interrupt 303 to a processor at block 336. In response to the interrupt 303, at block 338, the processor looks up a laser table 395 to determine which optical transceiver sent the interrupt 303. Once it is determined that the optical transceiver that sends the optical signal to the WSM also sends the interrupt 303, processing logic returns to block 324 in FIG. 3A. Then at block 324, processing logic determines that new light is detected on the receiver port of the optical transceiver. Processing logic may then continue at block 341 in FIG. 3C.

Referring to FIG. 3C, at block 341, processing logic may adjust the VOA in the WSM identified at block 320 in FIG. 3A. At block 342, processing logic measures the light at the corresponding optical transceiver identified at block 338 in FIG. 3B. Processing logic determines whether the optical signal received by the optical transceiver changes in response to the adjustment of the VOA at block 344. If the optical signal received by the optical transceiver does not change in response to the adjustment of the VOA, then processing logic concludes that the correlation is wrong at block 349, and hence, the optical fiber connection between the corresponding optical shelf and the optical electrical shelf is incorrect. Otherwise, processing logic continues at block 350. However, one should appreciate that the process 340, which includes the processing blocks 341, 342, and 344, may be an optional process and thus, may not be performed in every embodiment of the process to verify connectivity.

Referring back to FIG. 3C, processing logic causes a processor to look up a wavelength table 397 to determine which wavelength the port of the WSM receiving the optical signal supports at block 350. At block 352, processing logic then determines whether the wavelength at the port matches the wavelength of the light source of the optical transceiver identified. If they match, then the optical transceiver and the WSM are correlated at block 359, and thus, the connectivity between the corresponding optical shelf and the optical-electrical shelf is verified.

However, if the wavelengths do not match, then processing logic checks whether the light source of the optical transceiver is tunable at block 352. If the light source is not tunable, then processing logic concludes that the correlation between the optical transceiver and the WSM is wrong at block 349, and hence, the connectivity between the optical shelf and the optical-electrical shelf is incorrect.

Otherwise, if the light source is tunable, then at block 356, processing logic tunes the light source to the wavelength identified at block 350. In some embodiments, if the optical network node includes a protection module for the WSM, processing logic may check a protection module of the WSM to determine whether the protection module transmits optical signals at the same wavelength as the WSM does at block 358. If the protection module of the WSM does not transmit optical signals at the same wavelength as the WSM does, processing logic may send an alarm because the protection module is misconnected at processing block 360. Otherwise, processing logic concludes the optical transceiver and the WSM are correlated correctly at block 359, and hence, the connectivity between the corresponding optical shelf and the optical-electrical shelf is verified.

The technique described above enables the optical network node to automatically verify the connectivity between the WSMs and the optical transceivers. Furthermore, in some embodiments, the light sources (e.g., tunable lasers) in the optical transceivers are automatically tuned to the predetermined wavelengths. Therefore, the likelihood of operator error may be greatly reduced.

Figure 4:
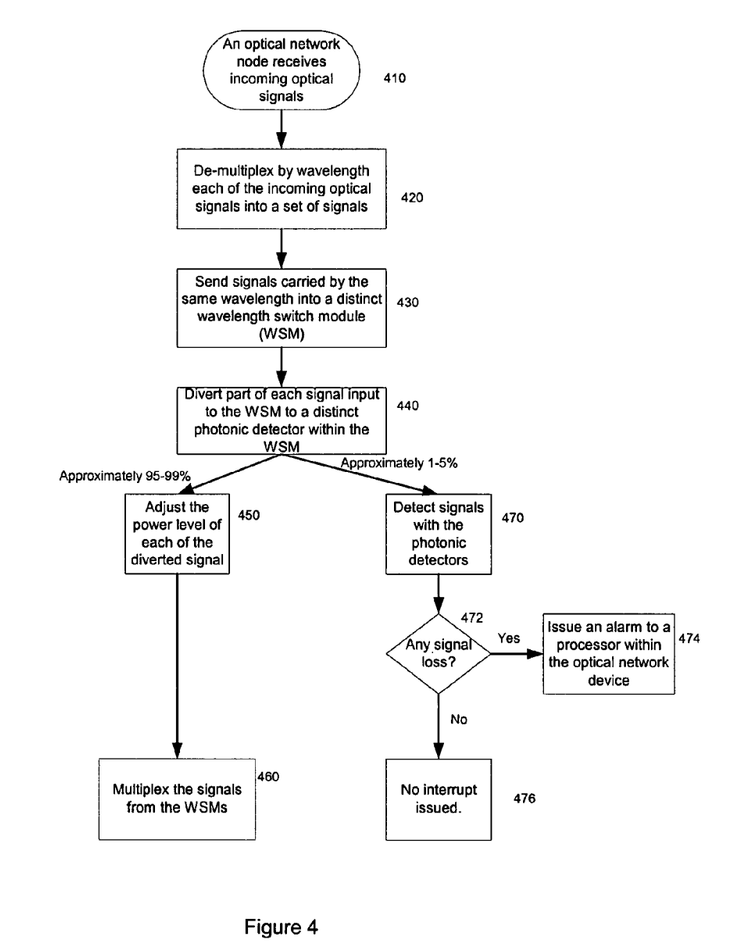
FIG. 4 illustrates a flow diagram of one embodiment of a process to detect signal failure on a per wavelength basis within an optical network node.

FIG. 4 illustrates a flow diagram of one embodiment of a process to detect signal failure on a per wavelength basis in an exemplary optical network node. The process is performed by processing logic that may comprise hardware (e.g., circuitry, dedicated logic, etc.), software (such as is run on a general-purpose computer system or a dedicated machine), or a combination of both.

The exemplary optical network node receives incoming optical signals at block 410. Processing logic de-multiplexes by wavelength each of the incoming optical signals into a set of signals (processing block 420). Then processing logic sends the demultiplexed signals having the same wavelength to a WSM designated to the wavelength (processing block 430). Processing logic diverts part of each signal input to the WSM to a distinct photonic detector within the WSM and sends the remaining part of the signal to a VOA (processing block 440). In one embodiment, approximately 1–5% of each of the optical signals entering the tap may be diverted to the photonic detectors, while 95–99% of each of the optical signals may be forwarded to the VOA.

On one hand, processing logic adjusts the power level of the remaining part of the signals using the VOA (processing block 450). Then processing logic multiplexes the adjusted signals by the wavelengths of the adjusted signals (processing block 460). The multiplexed signals may be output from the optical network node. In one embodiment, processing logic performs Dense Wavelength Division Multiplexing (DWDM) to multiplex the signals.

On the other hand, processing logic detects the diverted part of the signals using the photonic detectors (processing block 470). Processing logic checks whether there is any signal loss (processing block 472). If there is signal loss, processing logic issues an interrupt or an alarm to a processor (e.g., the processor 112 in FIG. 1A) within the optical network node (processing block 474). Otherwise, processing logic does not issue any interrupt to the processor (processing block 476).

Figure 5:
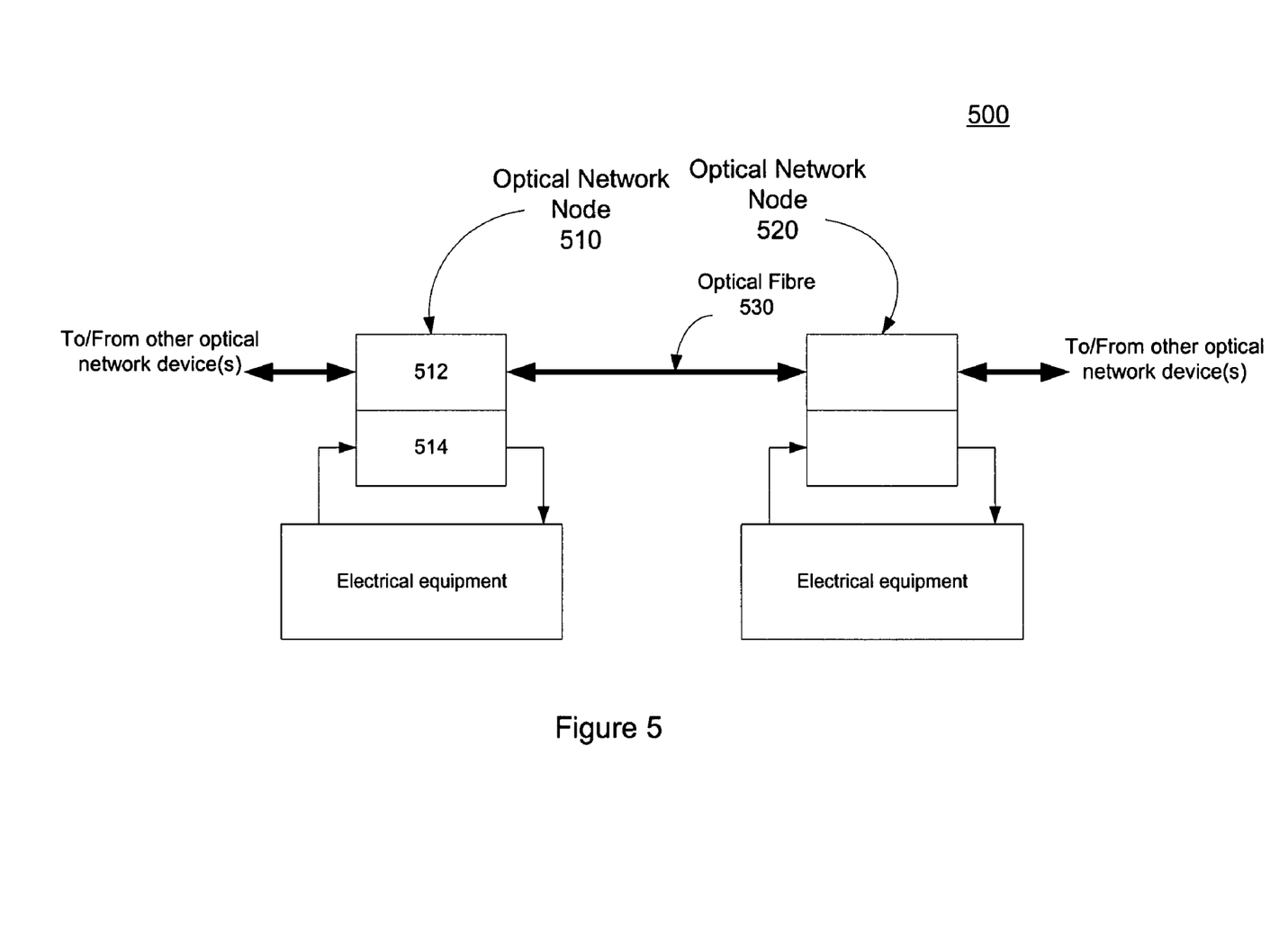
FIG. 5 illustrates one embodiment of an optical network system.

FIG. 5 shows an optical network system useable with some embodiments of the present invention. The system 500 includes at least two optical network nodes 510 and 520 and a number of optical fibers 530. The optical network nodes 510 and 520 are coupled to each other via the optical fibers 530. Each of the optical network nodes 510 and 520 may include an optical/electrical conversion domain (e.g., the optical/electrical conversion domain 514) to receive and/or send electrical signals to other electrical equipments, such as a personal computer (PC), a server, etc. The optical/electrical conversion domain converts the electrical signals into optical signals and inputs the optical signals to the optical processing domain (e.g., the optical processing domain 512) of the corresponding optical network node 510 and 520 such that the optical signals may be transmitted across the optical network system 500 via the optical fibers 530.

Various embodiments of the optical network nodes 510 and 520 have been discussed above. Furthermore, embodiments of a process and an apparatus to detect signal failure within each of the optical network nodes 510 and 520 have also been discussed above.

Note that any or all of the equipments of system 500 and the associated hardware may be used in various embodiments of the present invention. However, it can be appreciated that other configurations of the optical network system may include some or all of the equipments disclosed above.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. An apparatus comprising:
   a switch fabric to connect different ones of a first plurality of ports of said switch fabric with different ones of a second plurality of ports of said switch fabric;
   a plurality of photonic detectors to detect the presence or absence of an optical signal, said plurality of photonic detectors having a plurality of input ports;
   a variable optical attenuator having a plurality of input ports and a plurality of output ports;
   a tap including a plurality of input ports coupled to said second plurality of ports of the switch fabric, a first plurality of output ports coupled to said plurality of input ports of the variable optical attenuator, and a second plurality of output ports coupled to said plurality of input ports of said plurality of photonic detectors such that each of said plurality of photonic detectors is optically coupled to a different one of said second plurality of ports; and
   a plurality of wavelength demultiplexers each having an input to receive an incoming optical signal from an optical fiber, wherein each of said optical signals is capable of including one or more wavelengths, wherein each of said plurality of wavelength demultiplexers includes a plurality of outputs to carry a different one of said plurality of wavelengths, and wherein the ones of said plurality of outputs of said plurality of wavelength demultiplexer to carry the same one of said plurality of wavelengths are optically coupled to different ports of said first plurality of ports.

2. The apparatus of claim 1, wherein said switch fabric, plurality of photonic detectors, tap, and variable optical attenuator are all on the same die.

3. The apparatus of claim 1, further comprising
a plurality of wavelength multiplexers each having an output to provide an outgoing optical signal to an optical fiber, wherein each of said optical signals is capable of including one or more wavelengths, wherein each of said plurality of wavelength multiplexers includes a plurality of inputs to carry a different one of said plurality of wavelengths, and wherein the ones of said plurality of inputs of said plurality of wavelength multiplexers to carry the same one of said plurality of wavelengths are optically coupled to different ports of said second plurality of ports.

4. An optical network node comprising:
a plurality of wavelength switch modules each for a different one of a plurality wavelengths and each including,
  a switch fabric to configurably switch to connect different ones of a first plurality of ports of said switch fabric with different ones of a second plurality of ports of said switch fabric,
  a plurality of photonic detectors having a plurality of input ports to detect the presence or absence of an optical signal,
  a variable optical attenuator having a plurality of input ports and a plurality of output ports, and
  a tap including a plurality of input ports coupled to said second plurality of ports of the switch fabric, a first plurality of output ports coupled to said plurality of input ports of the variable optical attenuator, and a second plurality of output ports coupled to said plurality of input ports of said plurality of photonic detectors such that each of said plurality of photonic detectors is optically coupled to a different one of said second plurality of ports; and
a plurality of wavelength demultiplexers each having an input to receive an incoming optical signal from an optical fiber and each having a plurality of outputs optically coupled to provide the corresponding wavelengths to the corresponding wavelength switch modules.

5. The optical network node of claim 4, further comprising a plurality of wavelength multiplexers each having an output to provide an outgoing optical signal to an optical fiber and each having a plurality of inputs optically coupled to one of said second plurality of ports of each of said plurality of wavelength switch modules.

6. A system comprising:
an optical network including a plurality of optical fibers; and
a first optical network node, coupled to the optical network, the first optical network node comprising:
  a plurality of wavelength switch modules each for a different one of a plurality wavelengths and each including,
    a switch fabric to configurably switch to connect different ones of a first plurality of ports of said switch fabric with different ones of a second plurality of ports of said switch fabric;
    a plurality of photonic detectors having a plurality of input ports to detect the presence or absence of an optical signal;
    a variable optical attenuator having a plurality of input ports and a plurality of output ports; and
    a tap including a plurality of input ports coupled to said second plurality of ports of the switch fabric, a first plurality of output ports coupled to said plurality of input ports of the variable optical attenuator, and a second plurality of output ports coupled to said plurality of input ports of said plurality of photonic detectors such that each of said plurality of photonic detectors is optically coupled to a different one of said second plurality of ports; and
  a plurality of wavelength demultiplexers each having an input to receive an incoming optical signal from an optical fiber and each having a plurality of outputs optically coupled to provide the corresponding wavelengths to the corresponding wavelength switch modules.

7. The system of claim 6, wherein the first optical network node further comprises a plurality of wavelength multiplexers each having an output to provide an outgoing optical signal to an optical fiber and each having a plurality of inputs optically coupled to one of said second plurality of ports of each of said plurality of wavelength switch modules.

8. The system of claim 6, further comprising a second optical network node, coupled to the first optical network node via the optical network, to send the incoming optical signal to the first optical network node.

9. An apparatus comprising:
a switch fabric to connect different ones of a first plurality of ports of said switch fabric with different ones of a second plurality of ports of said switch fabric;
a plurality of photonic detectors to detect the presence or absence of an optical signal, said plurality of photonic detectors having a plurality of input ports;
a variable optical attenuator having a plurality of input ports and a plurality of output ports;
a tap including a plurality of input ports coupled to said second plurality of ports of the switch fabric, a first plurality of output ports coupled to said plurality of input ports of the variable optical attenuator, and a second plurality of output ports coupled to said plurality of input ports of said plurality of photonic detectors such that each of said plurality of photonic detectors is optically coupled to a different one of said second plurality of ports; and
a plurality of wavelength multiplexers each having an output to provide an outgoing optical signal to an optical fiber, wherein each of said optical signals is capable of including one or more wavelengths, wherein each of said plurality of wavelength multiplexers includes a plurality of inputs to carry a different one of said plurality of wavelengths, and wherein the ones of said plurality of inputs of said plurality of wavelength multiplexers to carry the same one of said plurality of wavelengths are optically coupled to different ports of said second plurality of ports.

10. The apparatus of claim 9, wherein said switch fabric, plurality of photonic detectors, tap, and variable optical attenuator are all on the same die.

11. The apparatus of claim 3, wherein said switch fabric, plurality of photonic detectors, tap, and variable optical attenuator are all on the same die.

* * * * *